US008767129B2

(12) United States Patent
Wei et al.

(10) Patent No.: US 8,767,129 B2
(45) Date of Patent: Jul. 1, 2014

(54) AUTO-CALIBRATING DEMODULATOR, ASSOCIATED METHOD AND TV RECEIVER

(71) Applicants: Chun-Kai Wei, Chupei (TW); Yung-Hsin Lin, Chupei (TW)

(72) Inventors: Chun-Kai Wei, Chupei (TW); Yung-Hsin Lin, Chupei (TW)

(73) Assignee: MStar Semiconductor, Inc. (TW)

( * ) Notice: Subject to any disclaimer, the term of this patent is extended or adjusted under 35 U.S.C. 154(b) by 21 days.

(21) Appl. No.: 13/650,341

(22) Filed: Oct. 12, 2012

(65) Prior Publication Data
US 2013/0033646 A1 Feb. 7, 2013

Related U.S. Application Data

(62) Division of application No. 12/833,184, filed on Jul. 9, 2010, now Pat. No. 8,363,169.

(30) Foreign Application Priority Data

Jul. 9, 2009 (TW) .............................. 98123284 A (51) Int. Cl.
*H04N 5/44* (2011.01)

(52) U.S. Cl.
USPC ....................................................... 348/725

(58) Field of Classification Search
USPC ............... 348/725–728, 731, 790–792, 794, 348/552–553; 725/131, 136, 151
See application file for complete search history.

(56) References Cited

U.S. PATENT DOCUMENTS

| 6,848,968 | B2 * | 2/2005 | Weiss et al. ................... 446/454 |
| 7,280,872 | B1 * | 10/2007 | Mosesov et al. ................ 607/60 |
| 7,590,392 | B2 | 9/2009 | Navaratnam et al. |
| 7,940,336 | B2 * | 5/2011 | Takatori ........................ 348/725 |
| 8,089,380 | B2 | 1/2012 | McLachlan et al. |
| 8,154,310 | B1 | 4/2012 | Maharyta et al. |
| 8,194,718 | B2 | 6/2012 | Ohba |
| 8,233,093 | B2 | 7/2012 | Wu |
| 8,606,215 | B2 * | 12/2013 | Sharma ....................... 455/343.2 |
| 2002/0140869 | A1 | 10/2002 | Carr et al. |
| 2003/0122620 | A1 * | 7/2003 | Burns et al. ................... 330/129 |
| 2003/0186647 | A1 | 10/2003 | Ikeda |
| 2004/0080466 | A1 * | 4/2004 | Hibino et al. ................. 343/860 |
| 2005/0066367 | A1 | 3/2005 | Fyke et al. |
| 2005/0141395 | A1 * | 6/2005 | Nakatani ....................... 369/116 |
| 2011/0181788 | A1 * | 7/2011 | Takatori ........................ 348/725 |

* cited by examiner

*Primary Examiner* — Paulos M Natnael
(74) *Attorney, Agent, or Firm* — Han IP Corporation (57) ABSTRACT

A demodulator comprises a reference voltage generating circuit for generating a reference voltage, a reference resistor for converting the reference voltage to a reference current, a current digital-to-analog converter (IDAC) for receiving a digital code and generating an output signal, a comparison apparatus for comparing the reference voltage with the output signal to generate a comparison output, and a calibration apparatus for updating the digital code according to the comparison output to calibrate the IDAC.

15 Claims, 7 Drawing Sheets

AUTO-CALIBRATING DEMODULATOR, ASSOCIATED METHOD AND TV RECEIVER

CROSS REFERENCE TO RELATED PATENT APPLICATIONS

This patent application is a Division of U.S. patent application Ser. No. 12/833,184, filed on Jul. 9, 2010, which claims priority from Taiwan Patent Application No. 098123284, filed in the Taiwan Patent Office on Jul. 9, 2009 and entitled "System and Method for Calibrating Output of a Demodulator and TV Receiver". The above-identified applications are incorporated by reference in their entirety.

TECHNICAL FIELD

The present disclosure relates to a digital/analog television (TV) receiver, and more particularly, to a demodulator comprising a current digital-to-analog converter (IDAC) with auto-calibration to reduce power consumption, associated method and TV receiver.

BACKGROUND OF RELATED ART

Figure 1:
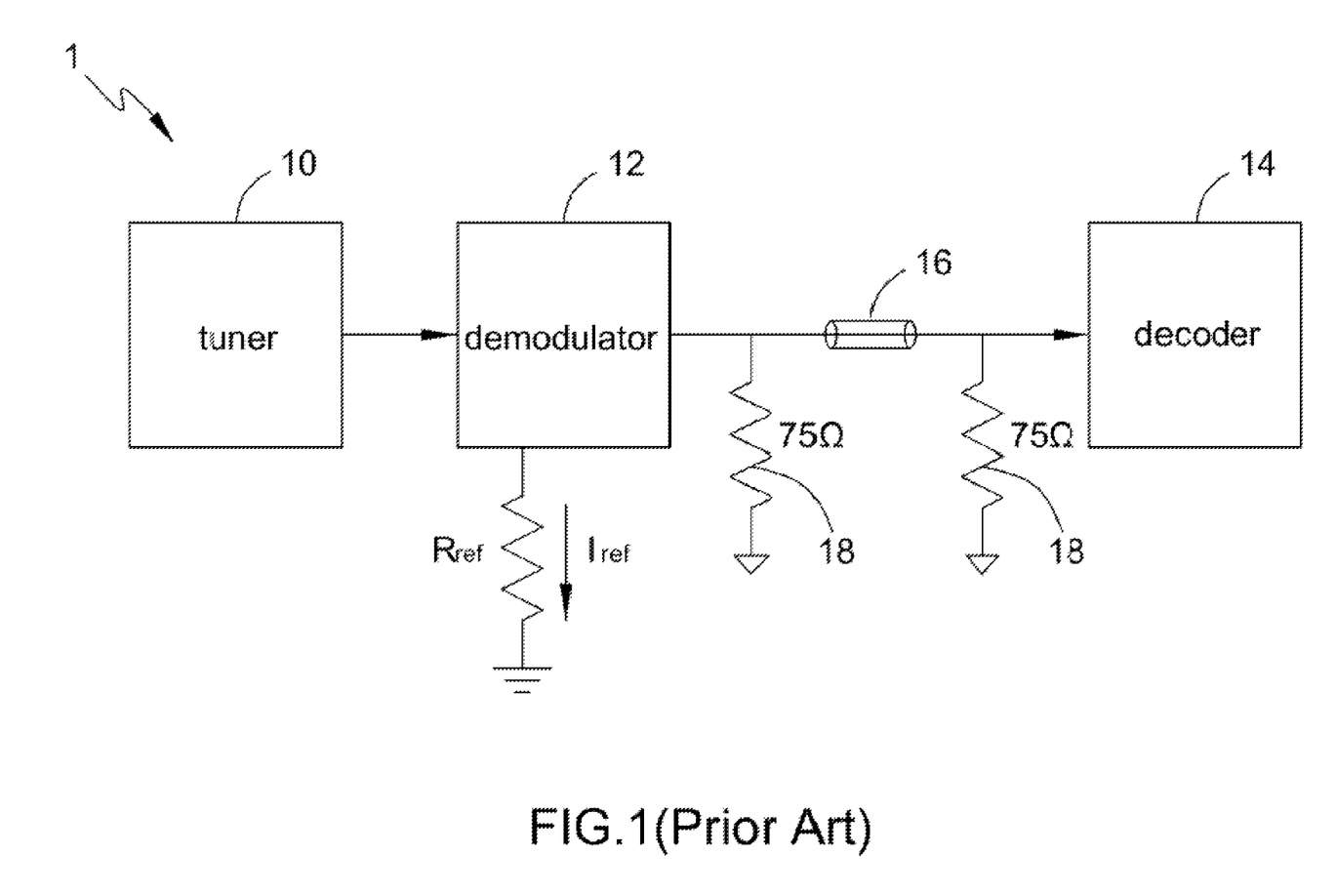
FIG. 1 is a block diagram of a conventional digital/analog TV receiver.

Broadcasting of digital television (DTV) signals is prevailing worldwide. DTV and conventional analog televisions (ATV) are now coexistent. FIG. 1 shows a block diagram of a conventional digital/analog TV receiver 1. The receiver 1 comprises a tuner 10, a demodulator 12, and a decoder 14. The demodulator 12 and the decoder 14 of the conventional receiver 1 are respectively disposed on separate print circuit boards (PCBs), between which a coaxial line 16 is installed for signal transmission. To impedance-match 75Ω of the coaxial line of the receiver 1, two 75Ω precision resistors 18 are applied on two PCBs of the demodulator 12 and the decoder 14. Further, the demodulator 12 also requires a precision reference resistor $R_{ref}$ so that an accurate circuit output current is generated and stability of an output voltage is maintained.

For that the demodulator 12 and the demodulator 14 are disposed on two separate PCBs, the receiver 1 is easily interfered by noises such that its area cannot be reduced. In addition, even if the precision resistors 18 are utilized in the receiver 1, an output voltage swing of the demodulator 12 may still have a noticeable variation due to manufacture errors of a die-to-die procedure and fluctuations of a power supply voltage, thus much likely leading to errors in signal transmission.

Therefore, a digital/analog TV receiver capable of suppressing noise interferences is in need for minimizing the variation of an output voltage swing of a decoder.

SUMMARY

In view of the foregoing disadvantages of a conventional digital/analog TV receiver, one object of the present disclosure is to provide a digital/analog TV receiver capable of auto-calibrating an output voltage swing of a demodulator to minimize a variation of the output voltage swing of the demodulator and to reduce power consumption.

The present disclosure describes a TV receiver comprising a demodulator, a decoder, a resistor and a PCB. The demodulator, the decoder and the resistor are disposed on the PCB, the demodulator and the decoder are connected via traces of the PCB, and the resistor is coupled between the demodulator and the decoder via the traces. Accordingly, a coaxial line need not be used between the demodulator and the decoder, and the resistor need not be limited to 75Ω either. Current consumption of the decoder is reduced by increasing a resistance of the resistor to save power. Deviation caused by the resistor and manufacturing processes is eliminated via the auto-calibration provided by the present disclosure.

The present disclosure further describes a TV demodulator comprises a reference voltage generating circuit, a reference resistance, a current digital-to-analog converter (IDAC), a comparator and a calibration apparatus. The reference resistance converts a reference voltage to a reference current. The IDAC receives a digital code to generate an output signal. The comparator compares the reference voltage with the output signal to generate a comparison output. The calibration apparatus updates the digital code according to the comparison output. Accordingly, a variation of an output voltage swing of the demodulator is auto-calibrated without external reference resistor.

The present disclosure further describes a method for calibrating an output of a demodulator comprises obtaining a base digital code according to a reference voltage; transmitting a calibration code to an IDAC; digitizing an output of the IDAC to obtain a corresponding digital code; comparing the obtained digital code and the base digital code to generate a comparison output; and updating the calibration code according to the comparison output.

DETAILED DESCRIPTION OF PREFERRED EMBODIMENTS

Figure 2:
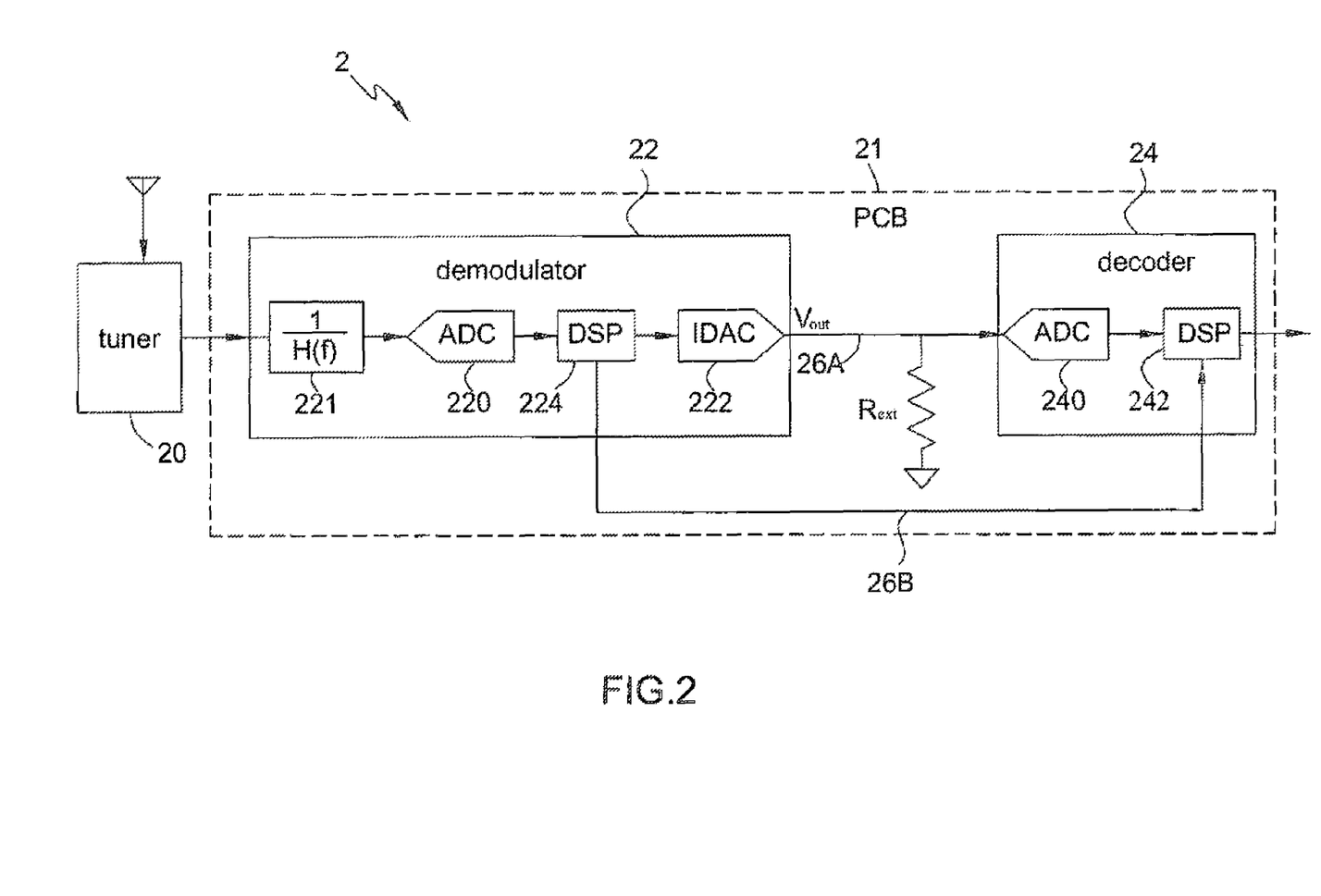
FIG. 2 is a block diagram of a digital/analog TV receiver in accordance with an embodiment of the present disclosure.

FIG. 2 is a block diagram of a digital/analog TV receiver 2. The receiver 2 comprises a tuner 20, a demodulator 22 and a decoder 24. Although the receiver 2 in this embodiment can receive and process a digital TV (DTV) signal and/or an analog TV (ATV) signal.

The tuner 20 matches an impedance of an antenna or a wire (not shown) and down-converts a radio frequency (RF) signal to a baseband signal. The demodulator 22 demodulates the received TV signal to retrieve a TV signal $V_{out}$. The decoder 24 then decodes the TV signal $V_{out}$ to accordingly display it on a screen (not shown). Referring to FIG. 2, the demodulator 22 comprises a filter 221, an analog-to-digital converter (ADC) 220, a digital signal processor (DSP) 224 and an IDAC 222, connecting in series. For example, the filter 221 removes from a signal noises and distortions caused by channel effects, and then transmits the processed signal to the ADC 220. An output of the ADC 220 is fed to the DSP 224 for baseband signal processing to generate a digital output. The IDAC 222 processes the digital output to generate an output $V_{out}$, which is then transmitted to the decoder 24 via an ATV signal path 26A and decoded by an ADC 240 and a DSP 242 of the decoder 24. Alternatively, the digital output of the DSP 224 of the demodulator 22 may be transmitted to the DSP 242 of the decoder 24 via a DTV signal path 26B. In this embodiment, a demodulator integrated chip (IC) can support both DTV and ATV signal outputs to reduce overall production cost.

In this embodiment, the demodulator and the decoder may be implemented on two independent ICs, which are disposed on a same PCB 21. The ATV signal path 26A and the DTV signal path 26B may be exemplified by traces on the PCB, e.g., copper traces.

An external resistor $R_{ext}$ coupled between IC circuits of the demodulator 22 and the decoder 24 is disposed on the PCB 21. The external resistor $R_{ext}$ has its one end connected to an output end $V_{out}$ of the decoder 22, and the other end grounded. In this embodiment, the external resistor $R_{ext}$ is not limited to a 75Ω precision resistor, e.g., the external resistor $R_{ext}$ can be a 300Ω resistor. Current consumption of the demodulator 22 is reduced for saving power.

Figure 3A:
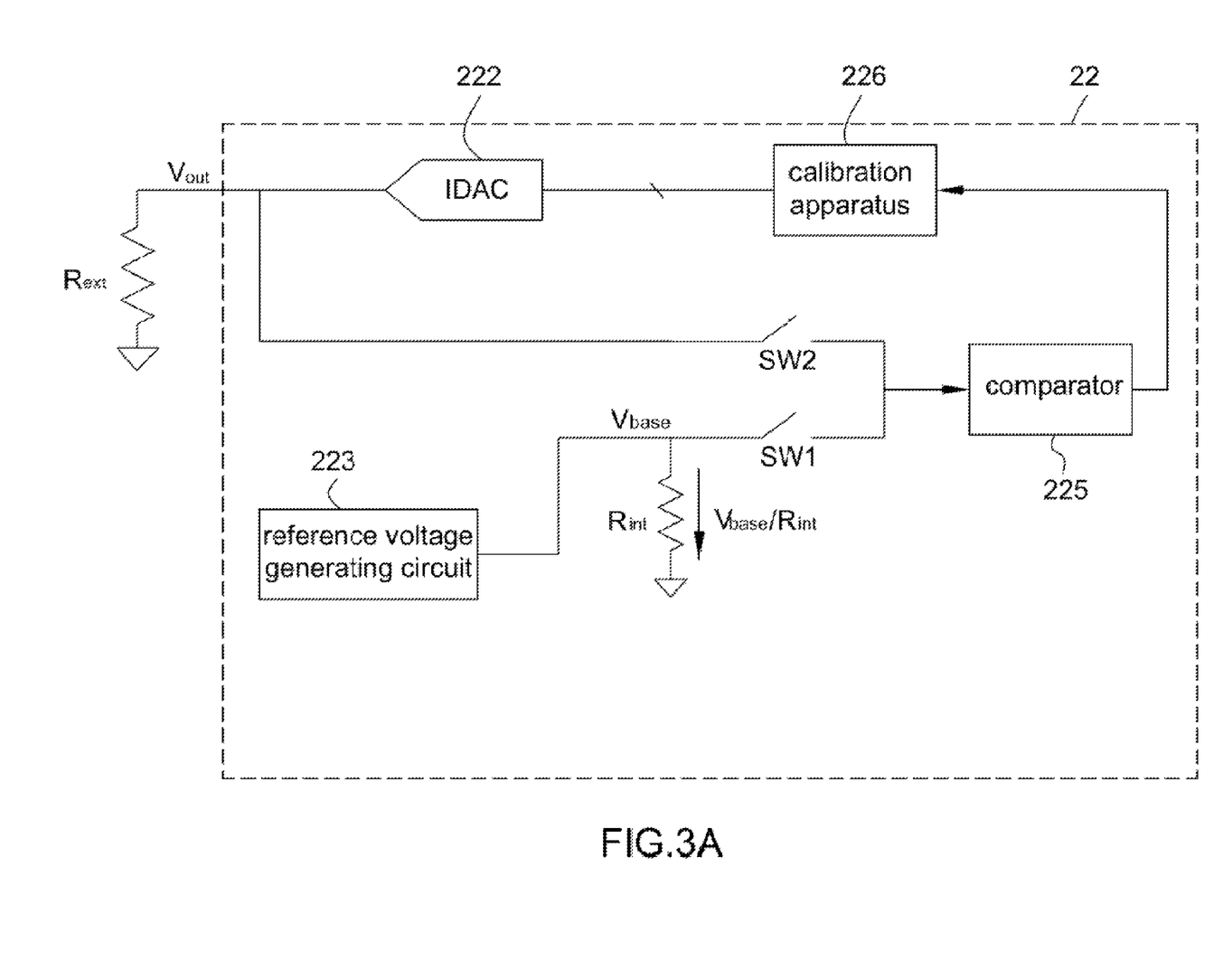
FIG. 3A is a circuit of a demodulator in accordance with an embodiment of the present disclosure.

Refer to FIG. 3A showing a circuit block diagram of a demodulator 22 in accordance with an embodiment of the present disclosure. The reference voltage generating circuit 223 generates a predetermined voltage that stays unaffected by environment variations or loads. In this embodiment, for example, the reference voltage generating circuit 223 is a bandgap (BG) circuit, which generates a predetermined reference voltage equal to a bandgap voltage of silicon (approximately 1.2 V), and the generated reference voltage stays almost unaffected by ambient temperature variations. An output voltage $V_{base}$ (e.g., a bandgap voltage $V_{bg}$) of the reference voltage generating circuit 223 is converted via an internal resistor $R_{int}$ to provide a reference current having a value of $V_{base}/R_{int}$ (e.g., $V_{bg}/R_{int}$).

Figure 3B:
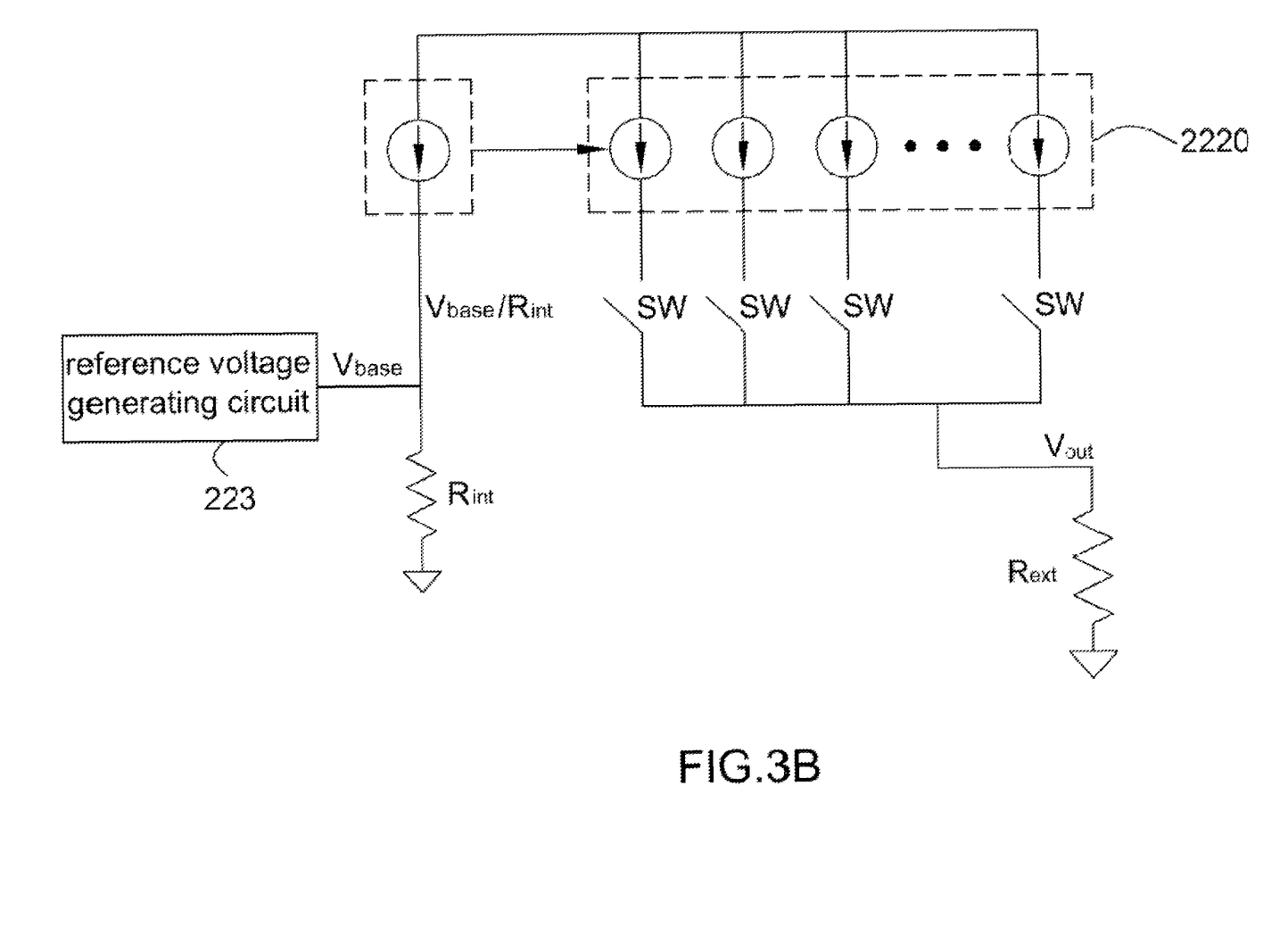
FIG. 3B is a current mirror of an IDAC and a reference circuit.

In this embodiment, the DAC 222 of the demodulator 22 can be realized by an IDAC (current DAC). Referring to FIG. 3B, the IDAC 222 comprises a plurality of current mirrors 2220 for mirroring the reference current $V_{base}/R_{int}$ provided by the reference voltage generating circuit 223 and the internal resistor $R_{int}$. A control switch SW, coupled to the current mirrors 2220, determines the driving capability. Alternatively, single IDAC 222 is applied in FIG. 3A, a plurality of IDACs 222 may also be applied to respectively process signals of different channel.

Referring to FIG. 3A, a comparator 225 and a calibration apparatus 226 are capable of auto-calibrating a swing of an output voltage $V_{out}$ of the demodulator 22. In this embodiment, the comparator 225 may be a successive approximation analog-to-digital converter (SAR ADC), or a low-cost searching apparatus such as a binary searching apparatus.

Figure 3C:
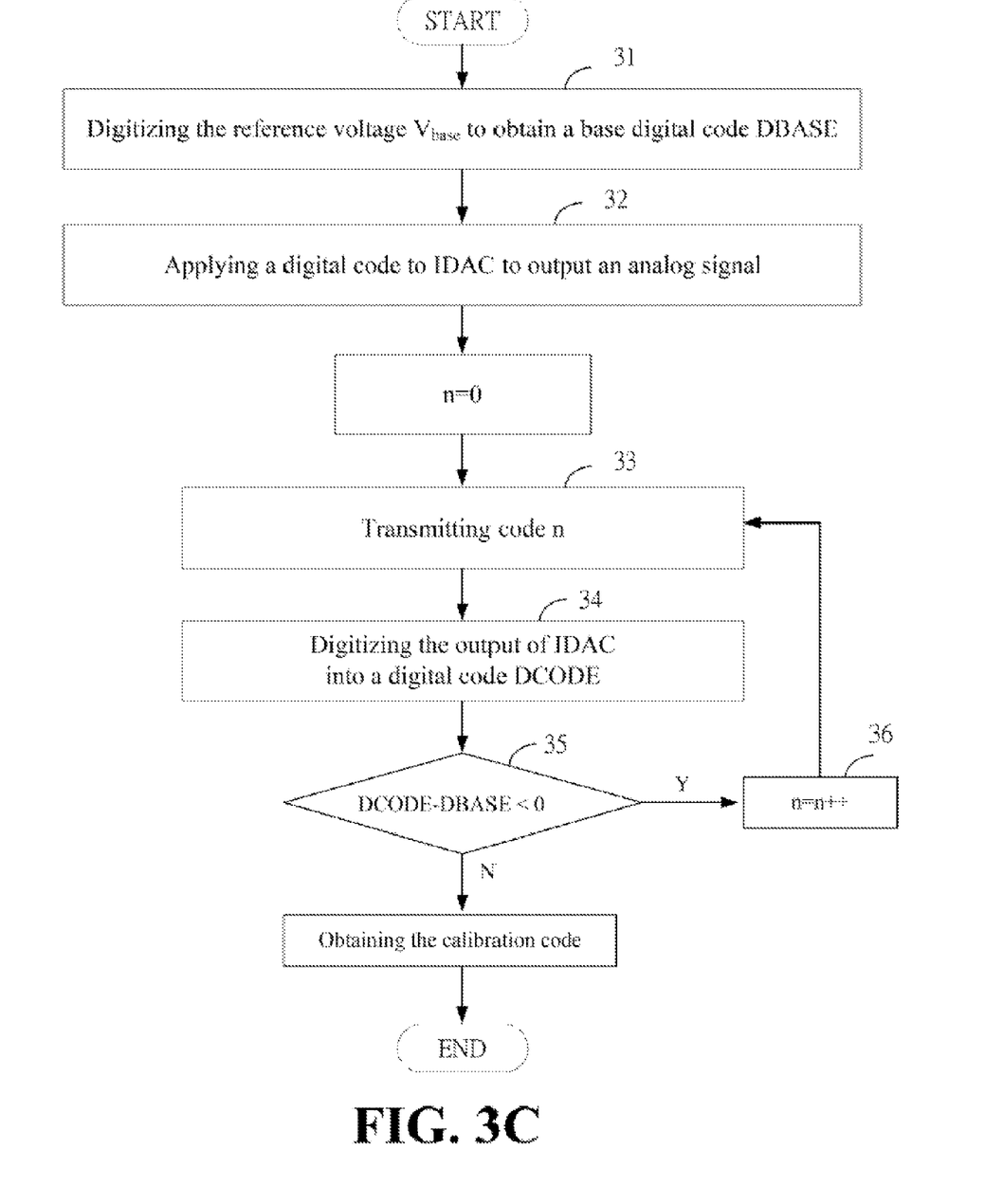
FIG. 3C is a flow chart of a calibration method in accordance with an embodiment of the present disclosure.

Refer to FIG. 3C showing a calibration flow in accordance with an embodiment of the present disclosure. The flow begins with closing a switch SW1 to apply a node voltage $V_{base}$ as a reference voltage to generate a comparison output via the comparator 225. For example, in Step 31, the reference voltage $V_{base}$ is compared with a predetermined comparison voltage (not shown) to obtain a base digital code DBASE. In Step 32, the calibration apparatus 226 transmits a digital code corresponding to the reference voltage $V_{base}$ to the IDAC 222, so as to activate the IDAC 222 to output a corresponding analog signal, i.e., $V_{base}$. Since a variation exists between the converted analog signal and the actual reference voltage $V_{base}$, the converted analog signal needs to be calibrated. In Step 33, the calibration apparatus 226 transmits a calibration code (i.e., code 0, n=0) for a lowest level to the IDAC 222. In Step 34, by closing a switch SW2, an output of the IDAC 222 is transmitted to the comparator 225, e.g., the SAR ADC, is digitized to a digital code DCODE. In Step 35, the calibration apparatus 226 compares the digital code DCODE with the base digital code DBASE. In Step 36, when the digital code DCODE is smaller than the base digital code DBASE (i.e., DCODE−DBASE<0), the calibration apparatus 226 transmits a next calibration code (i.e., code 1, n=n+1). In Step 37, by iterating the digitalization step and the comparison step of the base digital code DBASE, a calibration level is obtained when the digital code DCODE is greater than the base digital code DBASE (i.e., DCODE−DBASE>0), and accordingly a variation of the output voltage $V_{out}$ is calibrated. In the foregoing embodiment, the calibration codes are transmitted in an incremental order; however, the sequence is not limited to the foregoing approach. Alternatively, the calibration codes are transmitted in a decremental order or other sequences. Alternatively, a calibration code most approximates the base digital data DBASE is determined via binary approximation.

Figure 4A:
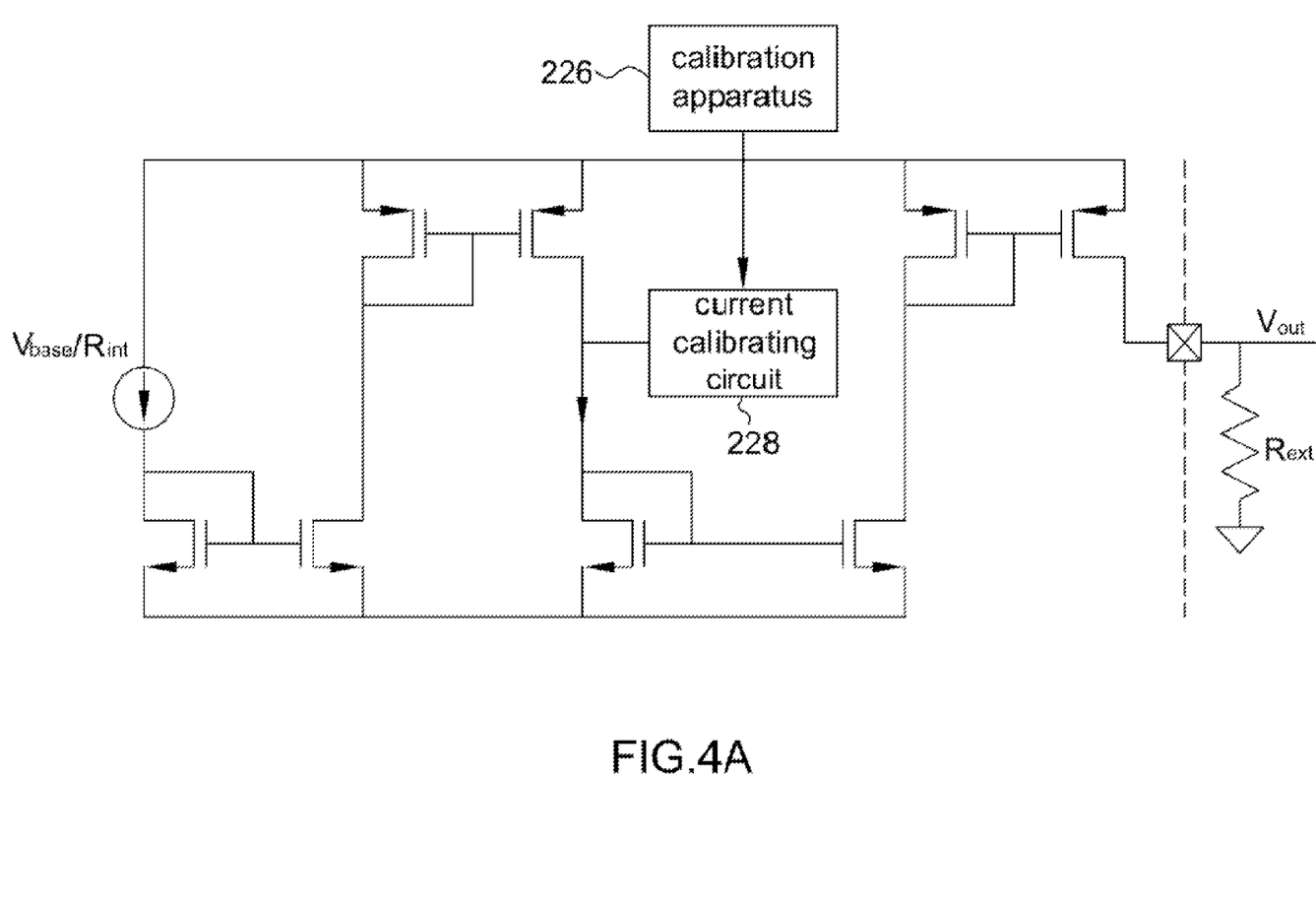
FIG. 4A and FIG. 4B are circuits of a demodulator capable of auto-calibrating a driving strength.
Figure 4B:
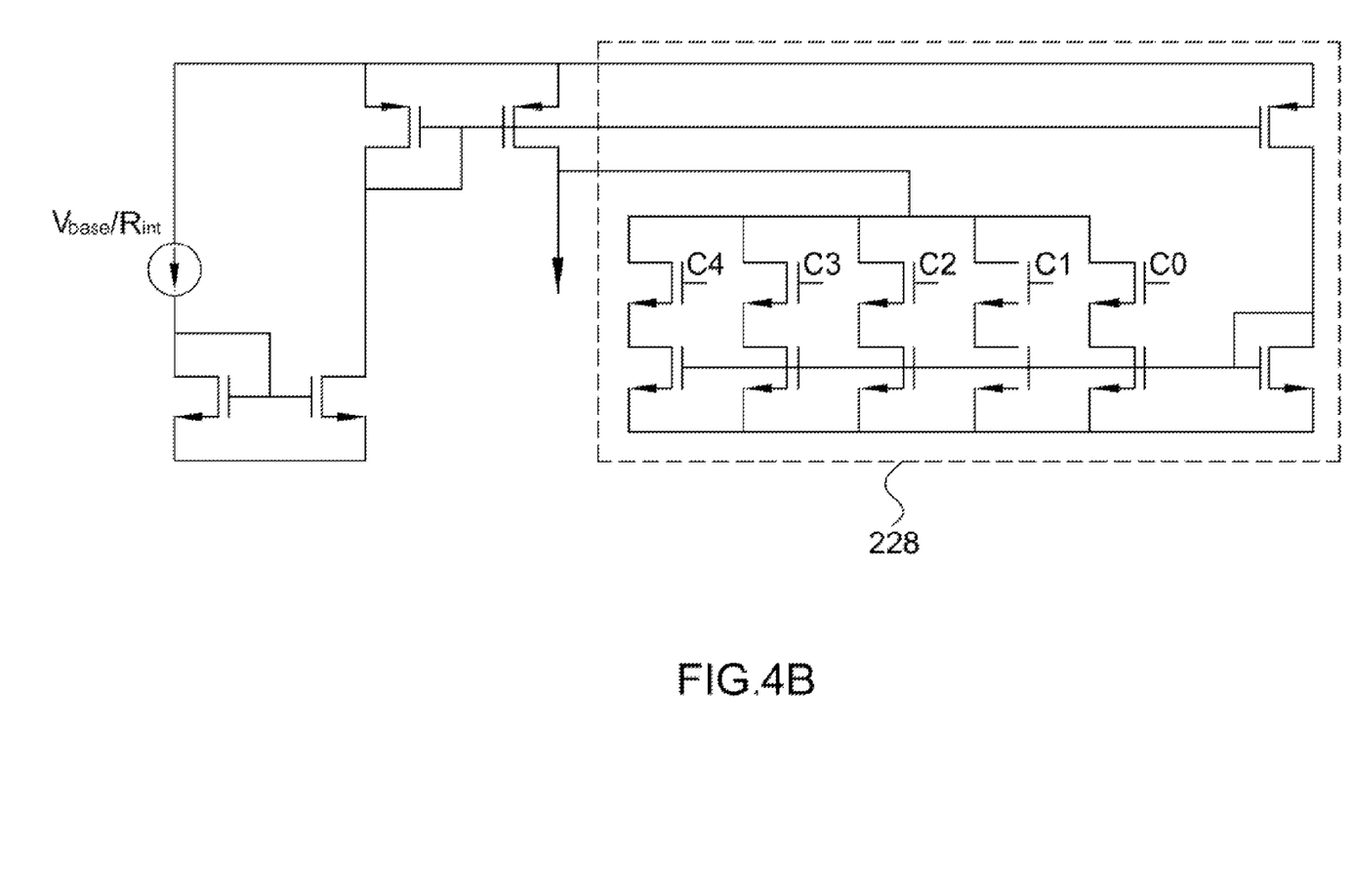

Referring to FIG. 4A showing a circuit of a demodulator 22 capable of auto-calibrating a driving capability in accordance with an embodiment of the present disclosure, the circuit comprises a reference current $V_{base}/R_{int}$, a current calibrating circuit 228, a calibration apparatus 226, and an external resistor $R_{ext}$. Referring to FIG. 4B showing a detailed circuit of the demodulator 22 capable of auto-calibrating a driving capability, a reference current $V_{base}/R_{int}$ and a current calibrating circuit 228 are depicted. For example, the current calibrating circuit 228 comprises a plurality of replicating current mirrors, which change a current drain of the current calibrating circuit 228 via 5-bit calibration codes C4, C3, C2, C1 and C0, so as to change a total current output reflectively generated by the IDAC 222.

In this embodiment, a digital/analog TV receiver 2 does not need the coaxial line 16, and the external resistor $R_{ext}$ is not limited to 75Ω. Different resistances, e.g., 300Ω, may also be applied provided that the auto-calibrating circuit is capable of auto-calibrating the driving capability. Preferably, the resistance of the external resistor $R_{ext}$ is associated with a sampling frequency of the IDAC 222. Preferably, a current consumption of the demodulator 22 is reduced by properly increasing the resistance of the external resistor $R_{ext}$ to save power. For example, when an output voltage swing of the demodulator 22 is 1.2V, a current consumption of the conventional demodulator 12 is 16 mA (i.e., 1.2V/75Ω), and a current consumption of the demodulator 22 using the external resistor $R_{ext}$ having a resistance 300Ω is 4 mA (i.e., 1.2V/300Ω), i.e., the power consumption is reduced by 75%. Thus, efficiency of a portable electronic apparatus using the demodulator 22 according to the present disclosure is increased. Compared with the conventional receiver 1 of the digital/analog TV, by implementing a feedback loop, which is formed by the comparator 225 and the calibration apparatus 226 in the embodiment according to the present disclosure, a variation of an output voltage swing is auto-calibrated so that an output voltage $V_{out}$ stays unaffected by errors caused by the external resistor $R_{ext}$, the internal resistor $R_{int}$, and the reference voltage generating circuit 223. According to the present disclosure, errors caused by resistors and manufacturing processes are thus eliminated.

To sum up, the present disclosure describes a demodulator, capable of auto-calibrating an output of a TV, comprises a reference voltage generating circuit, a reference resistor, an IDAC, a comparator, a first switch, a second switch and a calibration apparatus. The reference voltage generating circuit generates a reference voltage, e.g., the reference voltage generating circuit generates a bandgap voltage utilizing a bandgap voltage generating circuit. The reference resistor, an internal resistor, converts the reference voltage to a reference current. The IDAC receives a digital code and generates an output signal. The comparator compares the reference voltage with the output signal to generate a comparison output.

The calibration apparatus updates the digital code according to the comparison output. The first switch, coupled between the reference voltage generating circuit and the ADC, selectively feeds back the reference voltage to the ADC to obtain a base digital code. The second switch, coupled between the IDAC and the ADC, selectively feeds back an output of the IDAC to the ADC in order to obtain a corresponding digital code.

The present disclosure further describes a TV receiver comprises a demodulator, for demodulating a modulated signal to generate a demodulated output; a decoder, for decoding the demodulated output; an external resistor, and a PCB. The demodulator, the decoder and the external resistor are disposed on the PCB, demodulator is connected to the decoder via traces on the PCB, and the resistor is coupled between the demodulator and the decoder via traces.

The present disclosure further describes a method for calibrating an output of a demodulator comprises obtaining a base digital code according to a reference voltage; transmitting a calibration code to an IDAC; digitizing an output of the IDAC to obtain a corresponding digital code; comprising the digital code and the base digital code to generate a comparison output; and updating the calibration code according to the comparison output.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A television (TV) receiver, comprising:
   a demodulator that demodulates a modulated signal to provide a demodulated output, the demodulator comprising:
      an analog-to-digital converter (ADC);
      a digital signal processor (DSP); and
      a digital-to-analog converter (DAC),
      wherein the ADC, the DSP, and the DAC are connected in series, and an output of the DAC of the demodulator is connected to the decoder via an analog TV (ATV) signal path;
   a decoder that receives and decodes the demodulated output;
   a resistor; and
   a printed circuit board (PCB),
   wherein, the demodulator, the decoder and the resistor are disposed on the PCB, the demodulator is coupled to the decoder via a trace on the PCB, and the resistor is coupled to the demodulator and the decoder via the trace on the PCB.

2. The TV receiver of claim 1, wherein a resistance of the resistor is greater than 75Ω.

3. The TV receiver of claim 1, wherein at least the demodulator or the decoder comprises a respective integrated circuit (IC).

4. The TV receiver of claim 1, wherein an output of the ADC of the demodulator is fed back to the DSP of the demodulator for baseband signal processing to generate an output to be transmitted to a DSP of the decoder via a digital TV (DTV) signal path.

5. A television (TV) receiver, comprising:
   a demodulator that demodulates a modulated signal to provide a demodulated output, the demodulator comprising:
      a reference voltage generating circuit that generates a reference voltage;
      a reference resistor that converts the reference voltage to a reference current;
      a current digital-to-analog convertor (IDAC) that receives a digital code and generates an output signal;
      a comparison apparatus that compares the reference voltage with the output signal to generate a comparison output; and
      a calibration apparatus that updates the digital code according to the comparison output;
   a decoder that receives and decodes the demodulated output;
   a resistor; and
   a printed circuit board (PCB),
   wherein, the demodulator, the decoder and the resistor are disposed on the PCB, the demodulator is coupled to the decoder via a trace on the PCB, and the resistor is coupled to the demodulator and the decoder via the trace on the PCB.

6. The TV receiver of claim 5, wherein the reference voltage generating circuit comprises a bandgap circuit.

7. The TV receiver of claim 5, wherein the calibration apparatus increments the digital code according to the comparison output to calibrate an output swing of the output signal.

8. The TV receiver of claim 5, wherein the IDAC comprises a plurality of current mirrors to mirror the reference current.

9. The TV receiver of claim 5, wherein the reference resistor comprises an internal resistor.

10. The TV receiver of claim 5, wherein the comparison apparatus comprises an ADC, and wherein the reference voltage is converted to a base digital code.

11. The TV receiver of claim 10, wherein the calibration apparatus transmits a calibration code to the IDAC, wherein the IDAC converts the output signal to obtain a corresponding digital code, and wherein the calibration apparatus updates the calibration code until the corresponding digital code is approximate to the base digital code.

12. The TV receiver of claim 10, wherein the ADC comprises a successive approximation analog-to-digital converter (SAR ADC).

13. The TV receiver of claim 10, wherein the demodulator further comprises a first switch coupled between the reference voltage generating circuit and the ADC, and wherein the first switch selectively transmits the reference voltage to the ADC to obtain the base digital code.

14. The TV receiver of claim 13, wherein the demodulator further comprises a second switch coupled between the IDAC and the ADC, and wherein the second switch selectively transmits an output of the IDAC to the ADC to obtain a corresponding digital code.

15. The TV receiver of claim 14, wherein the calibration apparatus updates the calibration code according to the corresponding digital code.

* * * * *